(12) United States Patent
Zhou et al.

(10) Patent No.: US 12,478,042 B2
(45) Date of Patent: Nov. 25, 2025

(54) DETACHABLE REMOTE-CONTROL DEVICE FOR TRAINING DOG INDOOR AND OUTDOOR

(71) Applicant: Shenzhen Zheyin Intelligent Technology Co., Ltd., Shenzhen (CN)

(72) Inventors: Yongkai Zhou, Shenzhen (CN); Weiguo Wu, Shaoyang (CN)

(73) Assignee: Shenzhen Zheyin Intelligent Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/629,293

(22) Filed: Apr. 8, 2024

(65) Prior Publication Data

US 2025/0311700 A1  Oct. 9, 2025

(51) Int. Cl.
*A01K 15/02* (2006.01)
*A01K 27/00* (2006.01)

(52) U.S. Cl.
CPC .......... *A01K 15/021* (2013.01); *A01K 27/001* (2013.01); *A01K 27/009* (2013.01)

(58) Field of Classification Search
None
See application file for complete search history.

(56) References Cited

U.S. PATENT DOCUMENTS

| | | | | |
|---|---|---|---|---|
| 4,898,119 A * | 2/1990 | Tsai | | A01K 27/009 119/908 |
| 4,919,082 A * | 4/1990 | Tsai | | A01K 27/009 119/859 |
| 6,874,447 B1 * | 4/2005 | Kobett | | A01K 15/021 119/712 |
| 9,648,853 B2 * | 5/2017 | Ecker | | A01K 15/021 |
| 11,000,013 B2 * | 5/2021 | Van Curen | | A01K 27/009 |
| 12,225,885 B1 * | 2/2025 | Zhou | | A01K 27/009 |
| 2011/0132275 A1 * | 6/2011 | Huo | | A01K 15/021 119/858 |
| 2013/0014706 A1 * | 1/2013 | Menkes | | A61B 5/72 119/859 |
| 2015/0122199 A1 * | 5/2015 | Koplin | | A01K 15/021 119/718 |
| 2017/0000086 A1 * | 1/2017 | Fletcher | | A01K 27/001 |
| 2021/0106281 A1 * | 4/2021 | Tran | | A61B 5/486 |
| 2021/0289748 A1 * | 9/2021 | Ma | | A01K 15/021 |
| 2021/0307292 A1 * | 10/2021 | Holt, Jr. | | A01K 15/02 |
| 2022/0053736 A1 * | 2/2022 | Xiao | | A01K 15/021 |
| 2025/0204497 A1 * | 6/2025 | Zhou | | A01K 27/006 |

* cited by examiner

*Primary Examiner* — Muhammad Adnan
(74) *Attorney, Agent, or Firm* — JEEN IP LAW, LLC (57) ABSTRACT

A detachable remote control device for training dog is provided, which includes a main remote controller, a front end of the main remote controller is provided with an opening, two sets of positioning partitions are fixedly provided in the opening; front ends of two sides of the main remote controller are fixedly provided with a side spring rod, an external of the side spring rod is provided with a sliding installation frame; an arc-shaped clamp groove is provided in a middle of an inner wall of the sliding installation frame; a display device, two rows of side buttons are provided on two sides of the display device, and a display screen that is embedded at a top of the display device; the present disclosure provides with the display device and the sliding installation frame, thereby providing a convenient and flexible combination function for installation and disassembly.

8 Claims, 9 Drawing Sheets

DETACHABLE REMOTE-CONTROL DEVICE FOR TRAINING DOG INDOOR AND OUTDOOR

TECHNICAL FIELD

The present disclosure relates to the field of pet training accessories technologies, and in particular, to a detachable remote-control device for training dog indoor and outdoor.

BACKGROUND

When training pet dogs to simulate various movements, corresponding prompts are needed to help them remember, it is mainly controlled through a sound command, and a loudspeaker is often installed in a collar to convey the command.

The current remote-control device has the following drawbacks:
1. The remote-control body is fixed, which is inconvenient to flexibly adjust and choose to use according to the use environment, and lacks a convenient application structure for disassembly and assembly;
2. The precision in conveying a single instruction is insufficient and a multifunctional reminder structure for convenient control is lacked;
3. The control function to quickly stop dog movements is lacked.

SUMMARY

In view of this, the present disclosure provides a detachable remote control device for training dog indoor and outdoor, which has an external battery for convenient centralized power supply, can be switched by replacing the external battery. The external battery and a main remote controller both use a replaceable rechargeable battery, which is convenient to use.

The present disclosure provides a detachable remote-control device for training dog indoor and outdoor, including:
- a main remote controller, a front end of the main remote controller is provided with an opening, two sets of positioning partitions are fixedly provided in the opening; front ends of two sides of the main remote controller are fixedly provided with a side spring rod, an external of the side spring rod is provided with a sliding installation frame; an arc-shaped clamp groove is provided in a middle of an inner wall of the sliding installation frame;
- a display device, which is provided with two rows of side buttons on two sides, a display screen is embedded at a top of the display device; a bottom of the display device is fixedly provided with a bottom cover, two sides of the bottom cover can be clamped between the two sets of sliding installation frames;
- a training collar, where a top of the training collar is fixedly provided with an overhead seat, and a top of the overhead seat is fixedly provided with an anesthesia device; a top of the anesthesia device is fixedly provided with an antenna;
- where the main remote controller, display device, and training collar are all provided with a wireless communication module; the main remote controller and the display device both send a control instruction to the training collar through wireless communication; the main remote controller and display device are wirelessly connected; the display device displays a control information corresponding to the control instruction when the main remote controller or the display device sends the control instruction to the training collar.

In an embodiment of the present disclosure, front ends at two sides of a top of the main remote controller are fixedly provided with two sets of connection interfaces; a front end of the main remote controller is slidably provided with a sealing spring rod, and a front end of the sealing spring rod is fixedly provided with a limit plate.

In an embodiment of the present disclosure, front and rear ends of the display device are both a concave structure, a top of inner walls of two sides of the concave structure is provided with an installation slot, the installation slot is provided with a watch strap in an insertion manner; a bottom of the display device is provided with two sets of bottom connection slots, which pass through the bottom cover and align with the connection interface; the connection interface is inserted into the bottom connection slot when the bottom cover is installed between the two sets of sliding installation frames.

In an embodiment of the present disclosure, a right side of a rear of the overhead seat is fixedly provided with a transmission motor; an inner of a right side of the overhead seat is rotationally provided with a vibration shaft, the vibration shaft is an eccentric shaft; a right opening of the overhead seat is fixedly provided with a sealing plate, an inner of a right side of the overhead seat is slidably provided with a contact vibrator, a spring is provided between the contact vibrator and the sealing plate; the vibration shaft can contact with the contact vibrator when the vibration shaft rotates.

In an embodiment of the present disclosure, a top of the anesthesia device is integrally provided with a control piston, a top of the control piston is fixedly provided with an electric cylinder; a telescopic end of the electric cylinder is fixedly provided with a piston plate, the piston plate slides in the control piston.

In an embodiment of the present disclosure, a top of the anesthesia device is fixedly provided with a movable channel, a top of the movable channel is fixedly provided with a top cover through a threaded connection, and a top of the top cover is communicated with a pipeline below an outer part of the control piston; an internal needle cylinder is provided inside the movable channel, a spring is provided outside a telescopic end of the internal needle cylinder; a piston handle above the telescopic end of the internal needle cylinder is matched and slides inside the movable channel; an extension channel is provided at a position where the overhead seat is aligned with the movable channel, and a stop ring is fixedly provided in the extension channel to limit the internal needle cylinder to move down.

In an embodiment of the present disclosure, a top of the anesthesia device is slidably provided with a wedge-shaped block cooperating with a bracket, a sliding rod of the wedge-shaped block is sleeved on a spring, passes through the bracket and is fixedly provided with a deblocking ring; an external battery is insertably provided at a top of the anesthesia device, and one side of the external battery is provided with a wedge-shaped groove that matches the wedge-shaped block.

In an embodiment of the present disclosure, two sets of discharge electrodes passing through the training collar are provided in the overhead seat, and the discharge electrodes are connected to the external battery.

The beneficial effects are as follows:

1. The present disclosure is provided with a display device and a sliding installation frame, thereby providing a convenient and flexible combination function for installation and disassembly. It can be selected and used according to indoor and outdoor needs, and is easy to disassemble and assemble. The self-locking provided by the sliding installation frame and its external spring can be used for installation. When it is locked for installation, the watch strap can be included, and the watch strap can be positioned by a positioning partition to avoid shaking of the watch strap during remote control and prevent it from falling off.

2. Multi-functional reminder can be provided through remote control, which is convenient and safe. Cam vibration can be achieved through the vibration shaft for vibration reminders. The power of the transmission motor can be further adjusted by controlling it. The remote-control switch connects the discharge electrode for electric shock control, and emergency dog control is also provided. In addition, all functions are powered by external batteries, which can be switched by replacing the external battery. Both the external battery and the main remote controller use replaceable rechargeable batteries, which is convenient to use.

3. By using an internal needle cylinder, the dog's movements can be quickly restricted. The electric cylinder is activated to press the piston plate and input the air inside the control piston into the movable channel. After pressurization, the piston handle is pushed down to lower the internal needle cylinder which is inserted into a surface of the dog's body. Then, the piston handle continues to descend to contract the internal needle cylinder. The anesthesia device inside the internal needle cylinder is input into the dog's body for rapid anesthesia and to stop other movements of the dog.

Numeral reference: 1. Main remote controller; 101. Positioning partition; 102. Connection interface; 103. Side spring rod; 104. Sliding installation frame; 105. Limit plate; 106. Sealing spring rod; 2. Display device; 201. Side button; 202. Display screen; 203. Installation slot; 204. Watch strap; 205. Bottom cover; 206. Bottom connection slot; 3. Training collar; 301. Overhead seat; 302. Transmission motor; 303. Vibration shaft; 304, Sealing plate; 305. Contact vibrator; 4. Anesthesia device; 401. Control piston; 402. Electric cylinder; 403, piston plate; 404. Movable channel; 405. Top cover; 406. Internal needle cylinder; 407, Piston handle; 408. Wedge-shaped block; 409. Deblocking ring; 5. Antenna; 6. External battery; 7. Discharge electrode.

DESCRIPTION OF EMBODIMENTS

In order to render the purpose, scheme, and advantages of the technical solution of the present disclosure clearer, the following text will provide a clear and complete description of the technical solution of the specific embodiments of the present disclosure in combination with the accompanying drawings.

Embodiment 1

Please refer to the attached drawings in the specification, as shown in FIGS. 1 to 9:

The present disclosure proposes a detachable remote control device for training dog indoor and outdoor, including: a main remote controller 1, a front end of the main remote controller 1 is an open structure, two sets of positioning partitions 101 are fixedly provided in the open structure; front ends on two sides of the main remote controller 1 are fixedly provided with a side spring rod 103, an external of the side spring rod is provided with a sliding installation frame 104. An arc-shaped clamp groove is provided in a middle of an inner wall of the sliding installation frame 104; a display device 2, which is provided with two rows of side buttons 201 on two sides of display device 2, a display screen 202 is embedded at a top of display device 2; a bottom of the display device 2 is fixedly provide with a bottom cover 205, and two sides of the bottom cover 205 can be clamped between the two sets of sliding installation frames 104; a training collar 3, where a top of the training collar 3 is fixedly provided with an overhead seat 301, and a top of the overhead seat 301 is fixedly provided with an anesthesia device 4; a top of the anesthesia device 4 is fixedly provided with an antenna 5.

Figure 9:
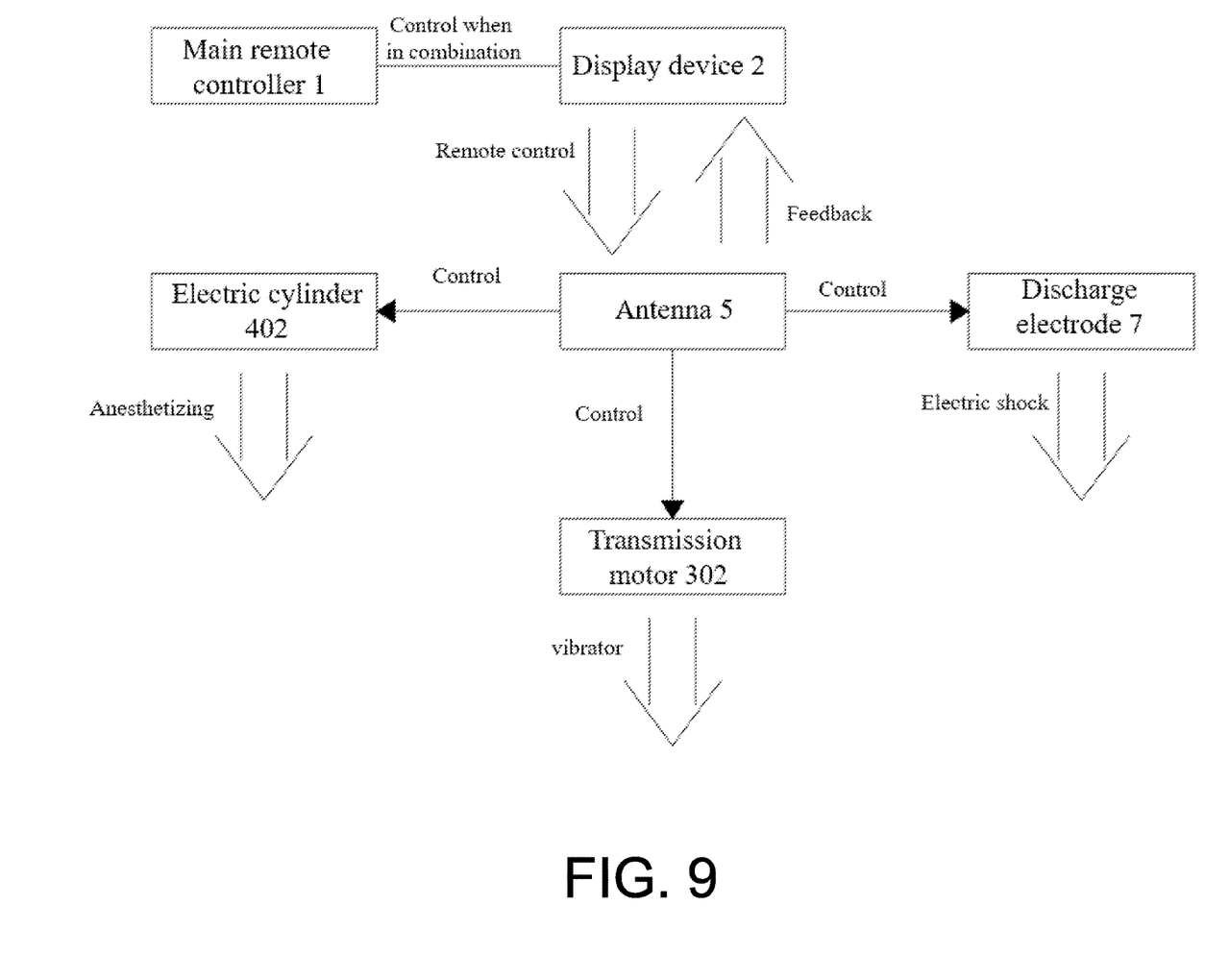
FIG. 9 shows a schematic diagram of a control flow structure in an embodiment of the present disclosure.

Where, the main remote controller 1, display device 2, and training collar 3 are all provided with a wireless communication module. The main remote controller 1 and display device 2 both send a control instruction to the training collar 3 through wireless communication. The main remote controller 1 and display device 2 are wirelessly connected. When the main remote controller 1 or display device 2 sends the control instruction to the training collar 3, the display screen 202 of the display device 2 displays a control information corresponding to the control instruction.

Two sets of connection interfaces 102 are fixedly provided on front ends at two sides of a top of the main remote controller 1; a front end of the main remote controller 1 is provided with a sealing spring rod 106 for internal sliding, and a front end of the sealing spring rod 106 is fixedly provided with a limit plate 105.

Where front and rear ends of the display device 2 are both a concave structure, an installation slot 203 is provided on a top of inner walls of two sides of the concave structure. The installation slot 203 is provided with a watch strap 204 in an insertion manner; a bottom of display device 2 is provided with two sets of bottom connection slots 206, which pass through the bottom cover 205 and align with the connection interface 102; When the bottom cover 205 is installed between the two sets of sliding installation frames 104, the connection interface 102 is inserted into the bottom connection slot 206 to connect the main remote controller 1 and the display device 2.

Where a right side of a rear of the overhead seat 301 is fixedly provided with a transmission motor 302; an inner of a right side of the overhead seat 301 is rotationally provided with a vibration shaft 303, which is an eccentric shaft; a right opening of the overhead seat 301 is fixedly provided with a sealing plate 304; an inner of a right side of the overhead seat 301 is slidably provided with a contact vibrator 305, a spring is provided between the contact vibrator 305 and the sealing plate 304; when the vibration shaft 303 rotates, it can contact with the contact vibrator 305; a rear of the overhead seat 301 is further provided with a hook structure that facilitates the setting of a drawstring.

Where a top of the anesthesia device 4 is integrally provided with a control piston 401, a top of the control piston 401 is fixedly provided with an electric cylinder 402. A telescopic end of the electric cylinder 402 is fixedly provided with a piston plate 403, which slides inside the control piston 401.

Where a top of the anesthesia device 4 is fixedly provided with a movable channel 404, a top of the movable channel 404 is fixedly provided with a top cover 405 through a threaded connection. A top of the top cover 405 is communicated with a pipeline below an outer part of the control piston 401; an internal needle cylinder 406 is provided inside the movable channel 404, a spring is provided outside the telescopic end of the internal needle cylinder 406. A piston handle 407 above the telescopic end of the internal needle cylinder 406 is matched and slides inside the movable channel 404; an extension channel is provided at a position where the overhead seat 301 is aligned with the movable channel 404, and a stop ring is fixedly provided in the extension channel to limit a descent of the internal needle cylinder 406.

Where, a top of anesthesia device 4 is slidably provided with a wedge-shaped block 408 cooperating with a bracket, a sliding rod of the wedge-shaped block 408 is sleeved on a spring, passes through the bracket and is fixedly provided with a deblocking ring 409; an external battery 6 is insertably provided at a top of the anesthesia device 4, and one side of the external battery 6 is provided with a wedge-shaped groove that matches the wedge-shaped block 408.

Where, the overhead seat 301 is provided with two sets of discharge electrodes 7 that pass through the training collar 3, and the discharge electrodes 7 are connected to the external battery 6.

Figure 1:
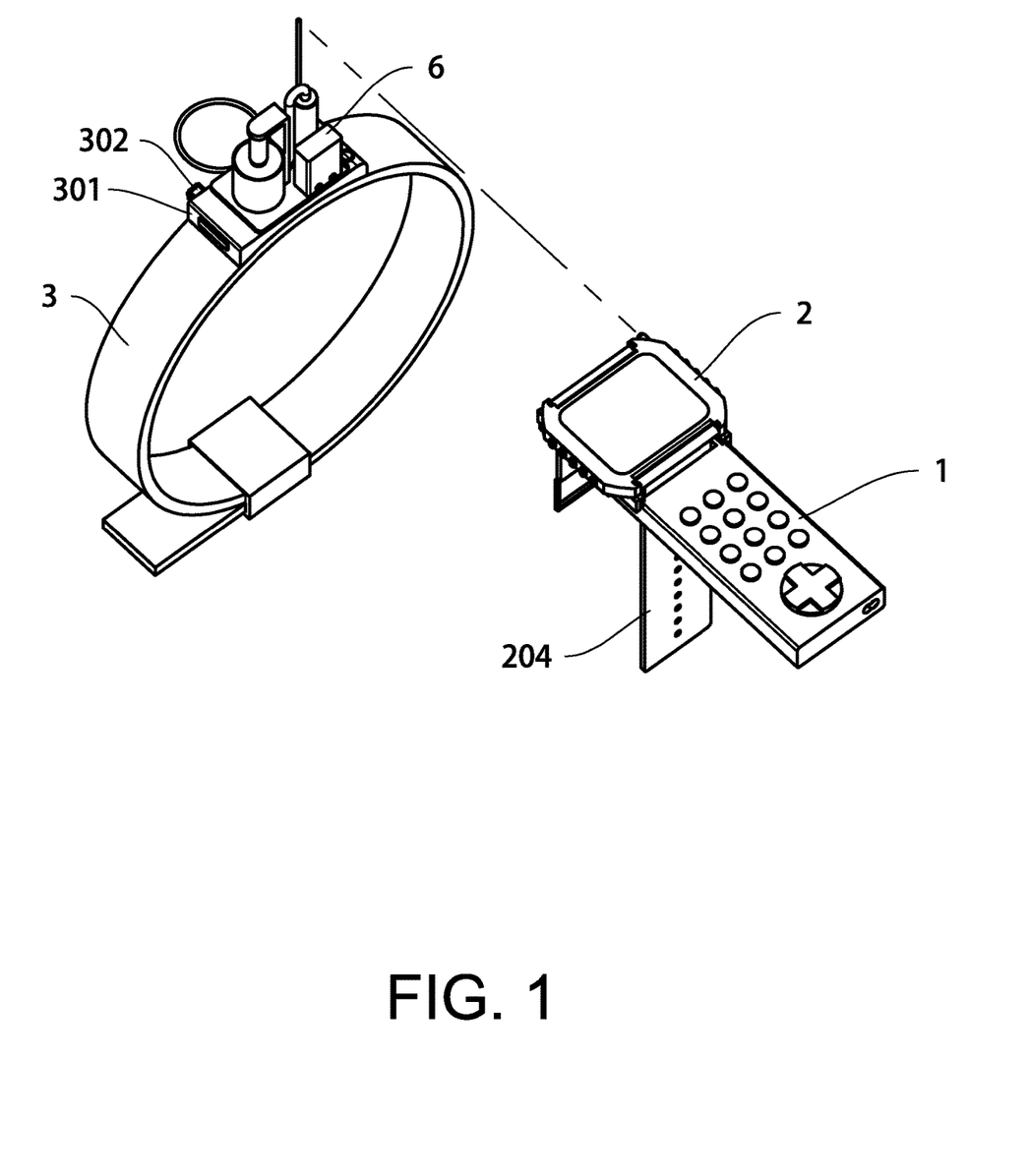
FIG. 1 shows a schematic diagram of a three-dimensional structure of an embodiment of the present disclosure.
Figure 2:
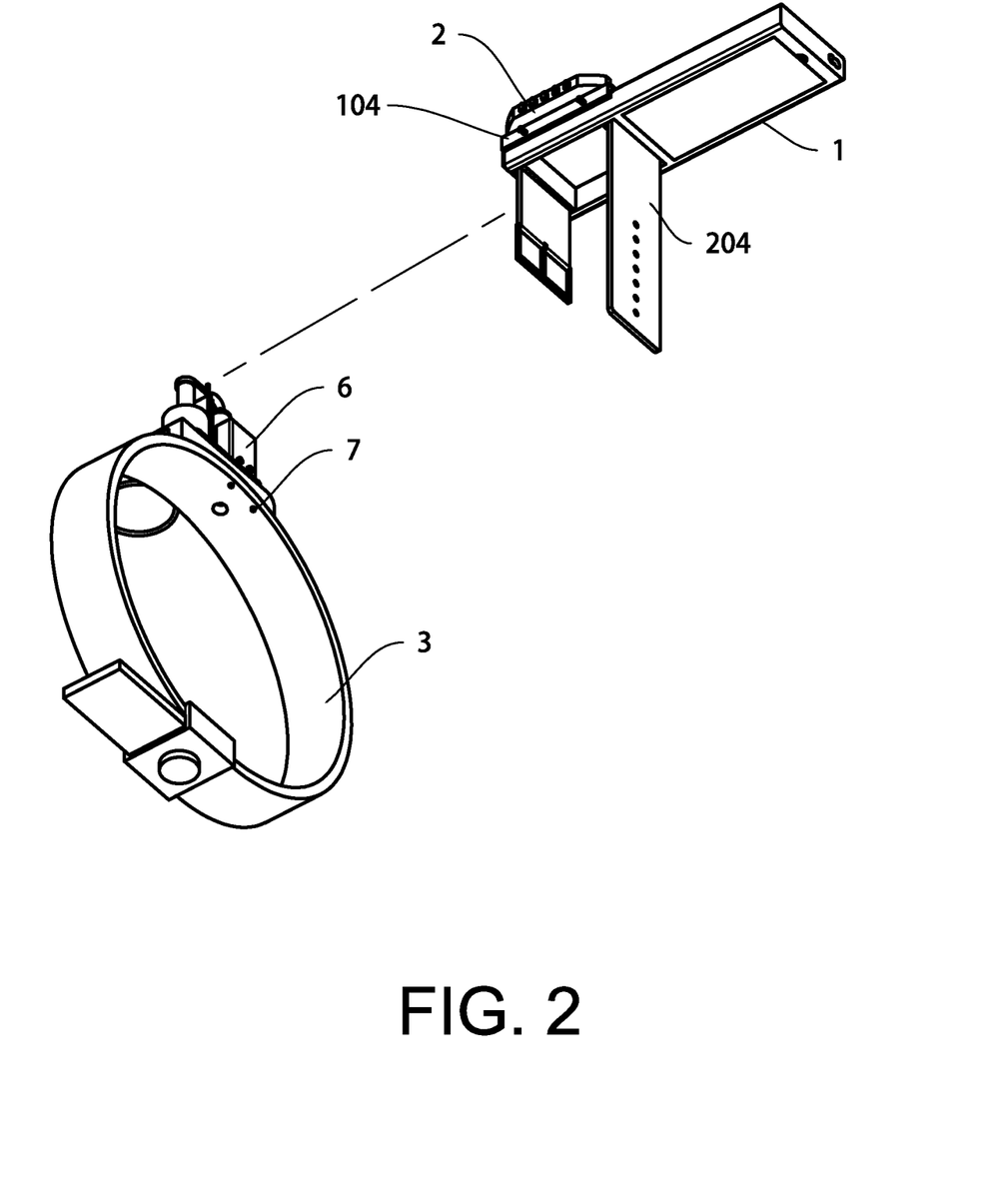
FIG. 2 shows a schematic diagram of a lateral tilt structure in an embodiment of the present disclosure.
Figure 3:
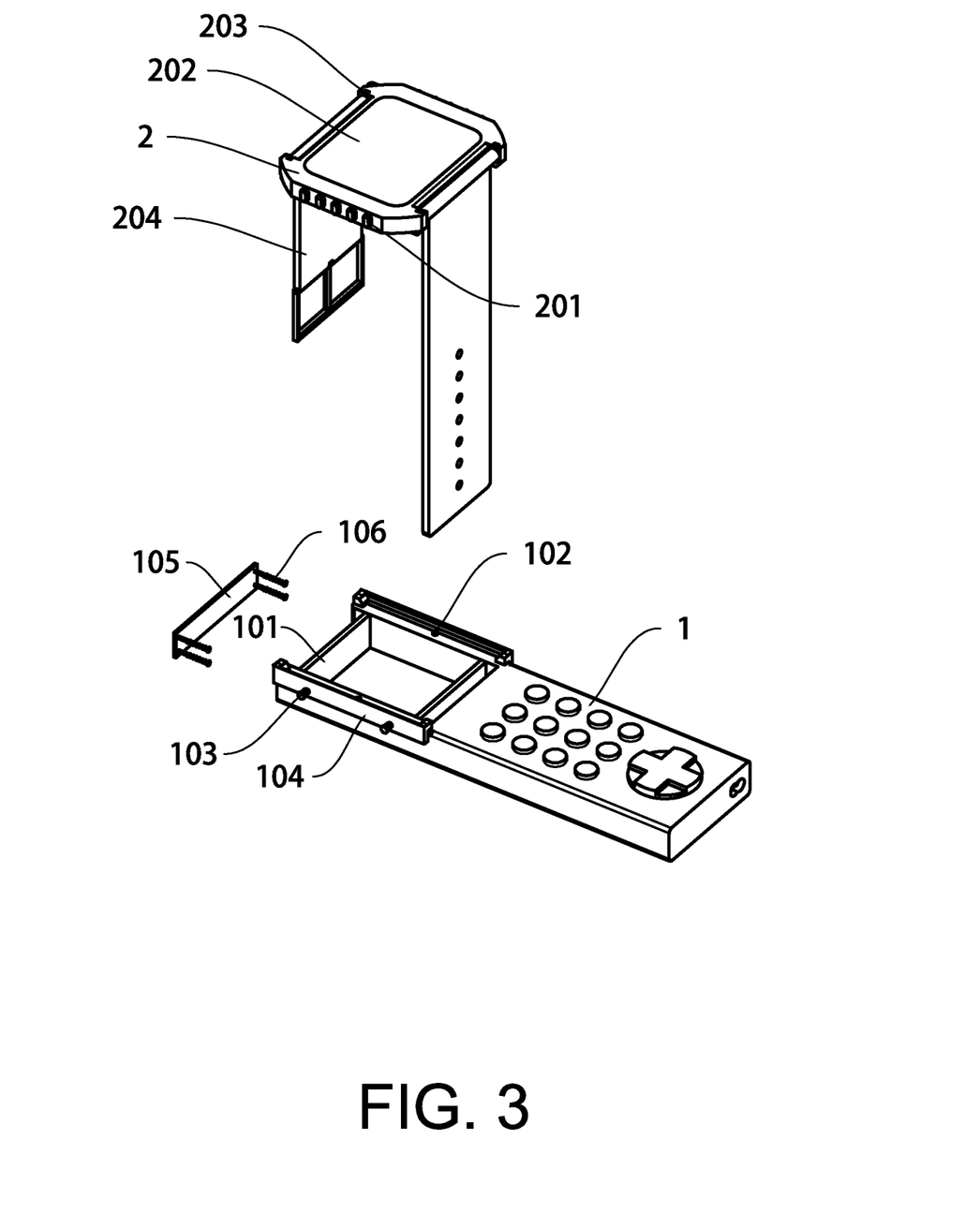
FIG. 3 shows a schematic diagram of a disassembly structure of a main remote controller in an embodiment of the present disclosure.
Figure 4:
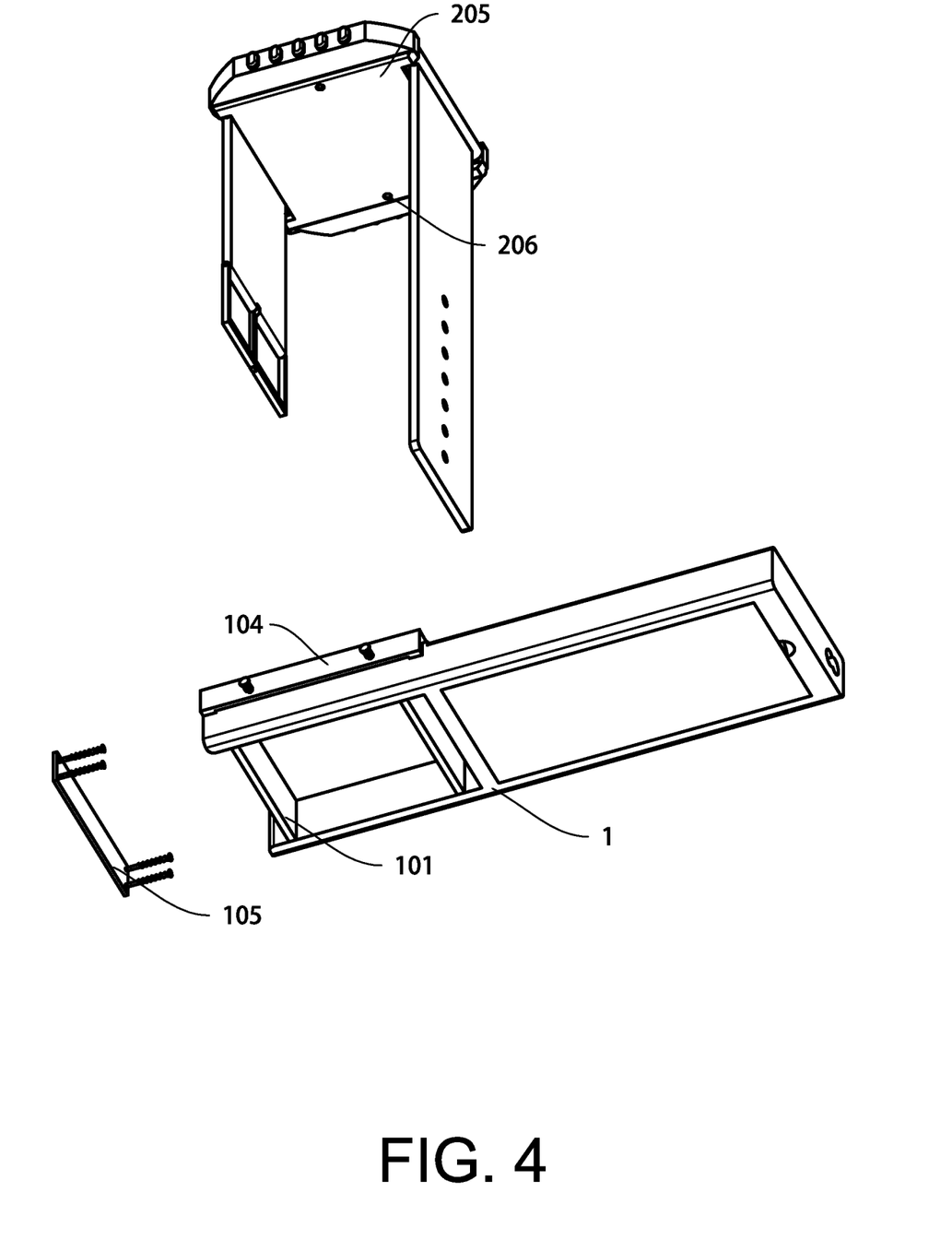
FIG. 4 shows a schematic diagram of a lateral orientation structure of an embodiment in FIG. 3 in the present disclosure.

As shown in FIGS. 3-4, when used outdoors, it is generally necessary to lead the dog to a training site and then fold up the leash for training, making it inconvenient to carry a remote control. At this time, both fingers lift the front and rear ends of the display device 2, pull the display device 2 upwards, and directly pull it out. Then, the watch strap 204 is used to fix the display device 2 at the wrist for portable use;

The display device 2 is powered by a built-in battery, and a usage status of training collar 3 can be observed through the display screen 202. The side buttons 201 on two sides of the display device 2 are buttons used to trigger a control command, such as an anesthesia button, an electric shock button, a vibration button, etc. When any side button 201 is pressed, the display device 2 generates a corresponding control command. The control command is transmitted to an antenna 5 through wireless communication module inside the display device 2, and the wireless communication module of the training collar 3 obtains the control command through antenna 5, which in turn triggers a training project based on the control command.

It can be understood that the main remote controller 1 is provided with multiple remote control buttons, such as anesthesia button, electric shock button, vibration button, etc. When any remote control button is pressed, the corresponding control command can be generated. The wireless communication module in the main remote controller 1 sends the control command to the antenna 5, so that the wireless communication module of the training collar 3 obtains the control command through antenna 5, and then triggers the training project based on the control command. Therefore, the present disclosure can send the control command to the training collar 3 either through the main remote controller 1 or through the display device 2. The display screen 202 of the display device 2 displays a control information corresponding to the control command. For example, when the control command is an anesthesia command (i.e. the anesthesia button is pressed), the information displayed on the display screen 202 can be "anesthesia".

Where a wireless communication connection is provided between the main remote controller 1 and the display device 2. When the control command is sent through the main remote controller 1, the display device 2 will also receive the control command, and display the corresponding control information based on a received control command.

Embodiment 2

On the basis of Embodiment 1, as shown in FIGS. 1-4, when used indoors, the display device 2 is installed back on the main remote controller 1, the bottom cover 205 is clamped between the two sets of sliding installation frames 104, and fixed automatically by a force provided by an outer spring of the side spring rod 103. At this time, the connection interface 102 is inserted into the bottom connection slot 206, connects the main remote controller 1 and the display device 2. That is, the main remote controller 1 and the display device 2 can also be wired, and a training control can be carried out with the main remote controller 1; at this time, it is still possible to charge the display device 2.

The watch strap 204 can be selectively removed and installed conveniently. When the watch strap 204 is tied to the wrist, a direction of force on its structure can be naturally locked to prevent the display device 2 from falling off.

Embodiment 3

Figure 5:
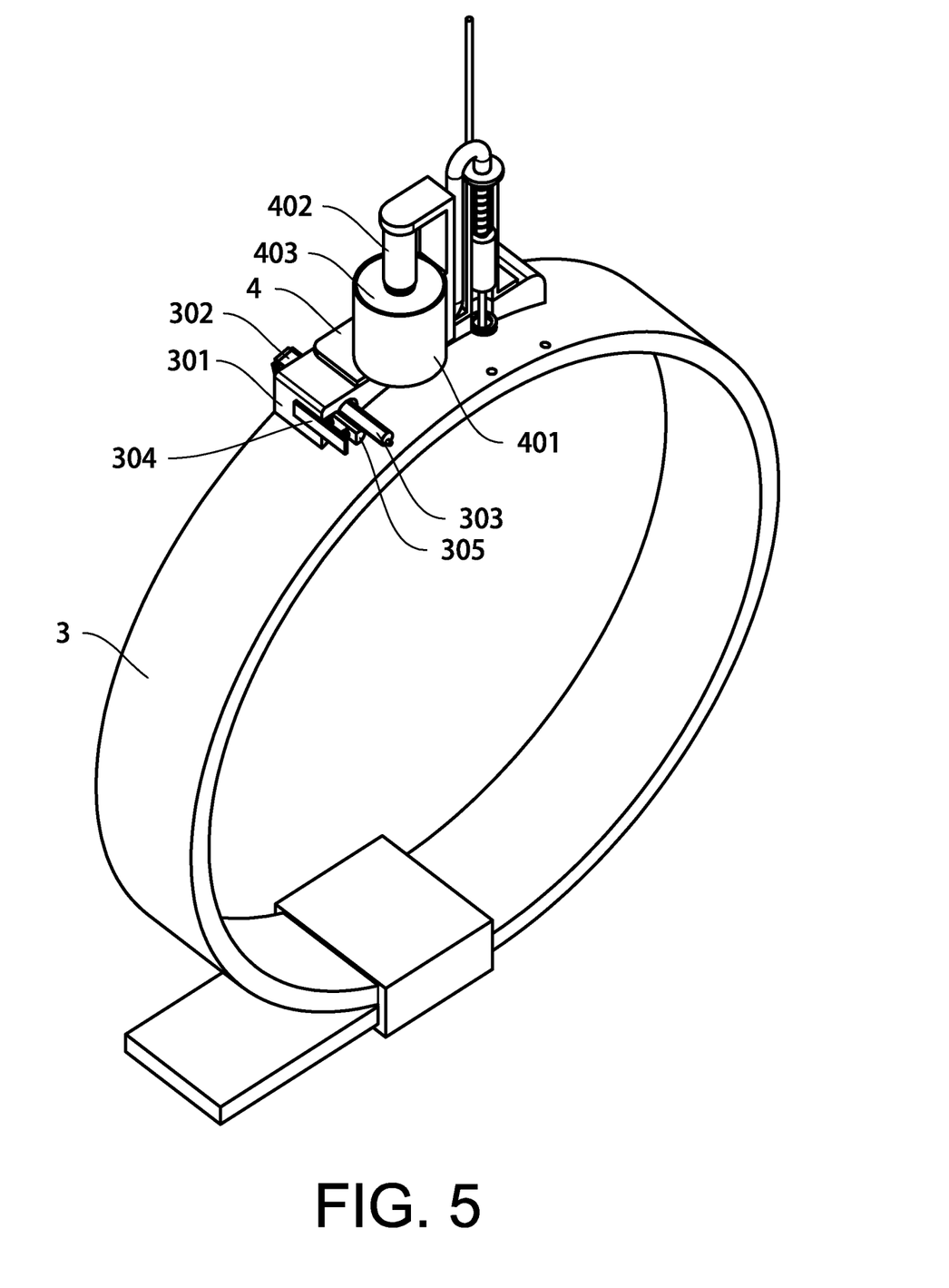
FIG. 5 shows a schematic diagram of a three-dimensional cross-sectional structure of a training collar in an embodiment of the present disclosure.
Figure 6:
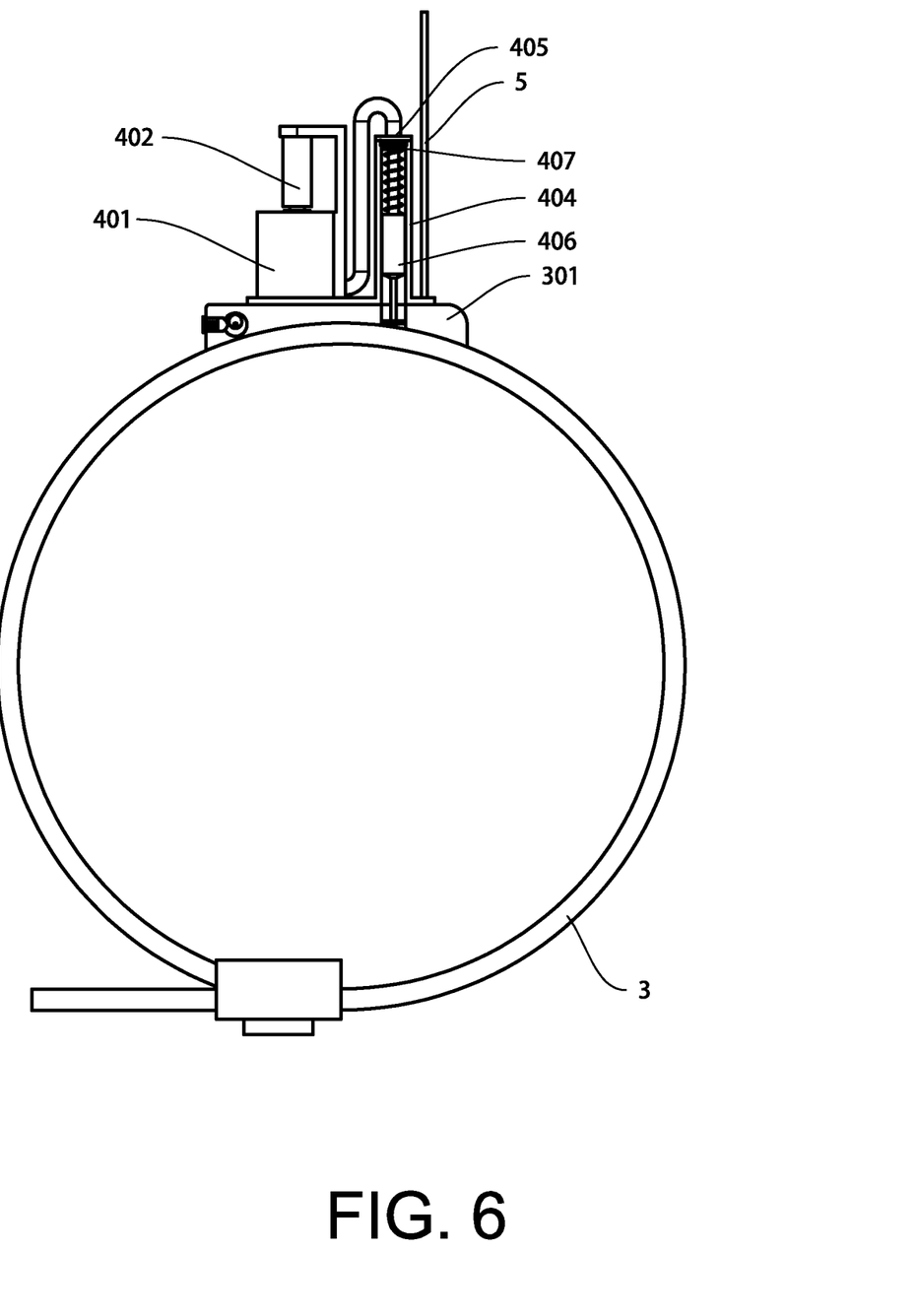
FIG. 6 shows a schematic diagram of a side cross-sectional structure of the training collar in an embodiment of the present disclosure.
Figure 7:
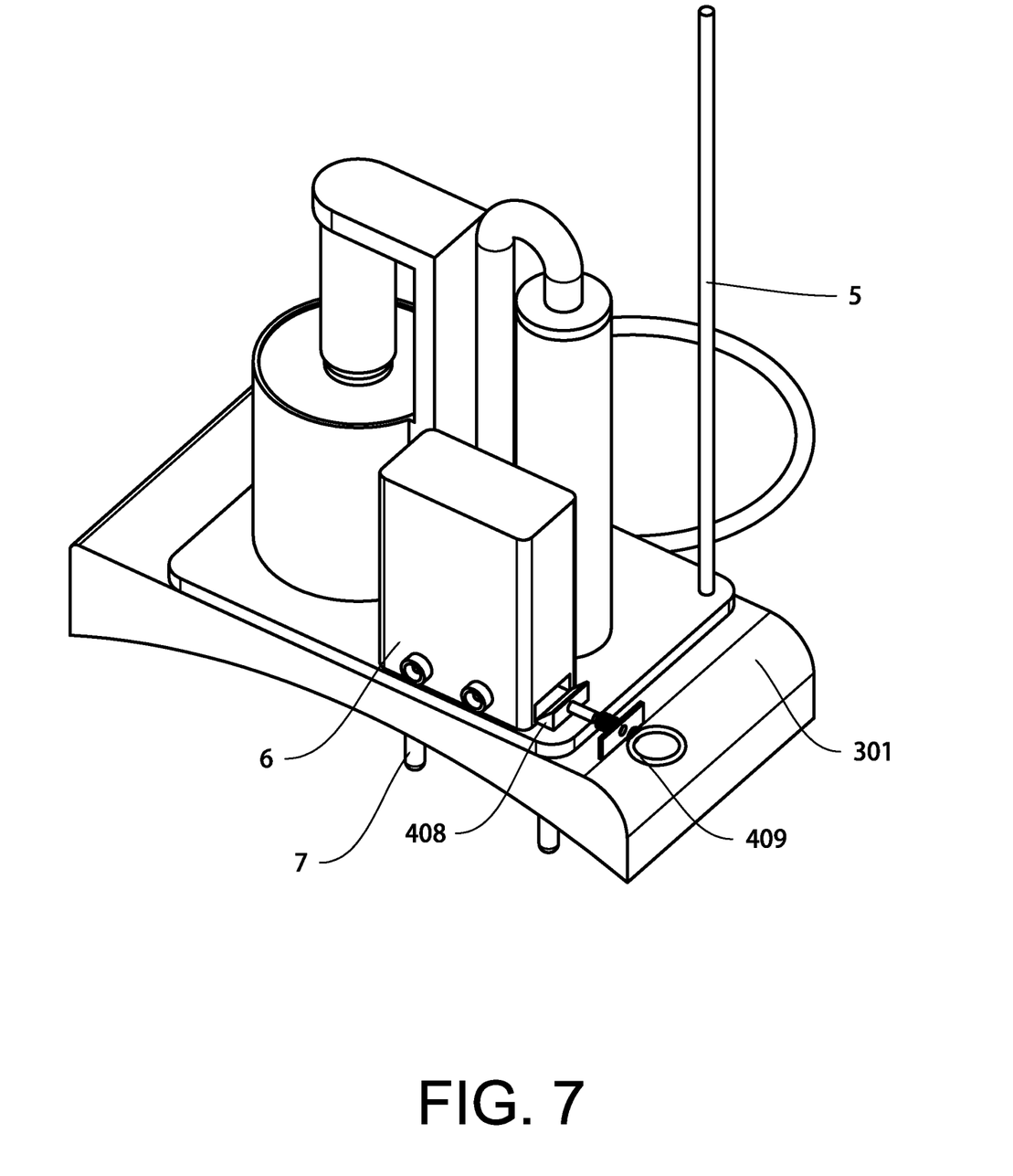
FIG. 7 shows a schematic diagram of an assembly structure of an external battery in an embodiment of the present disclosure.
Figure 8:
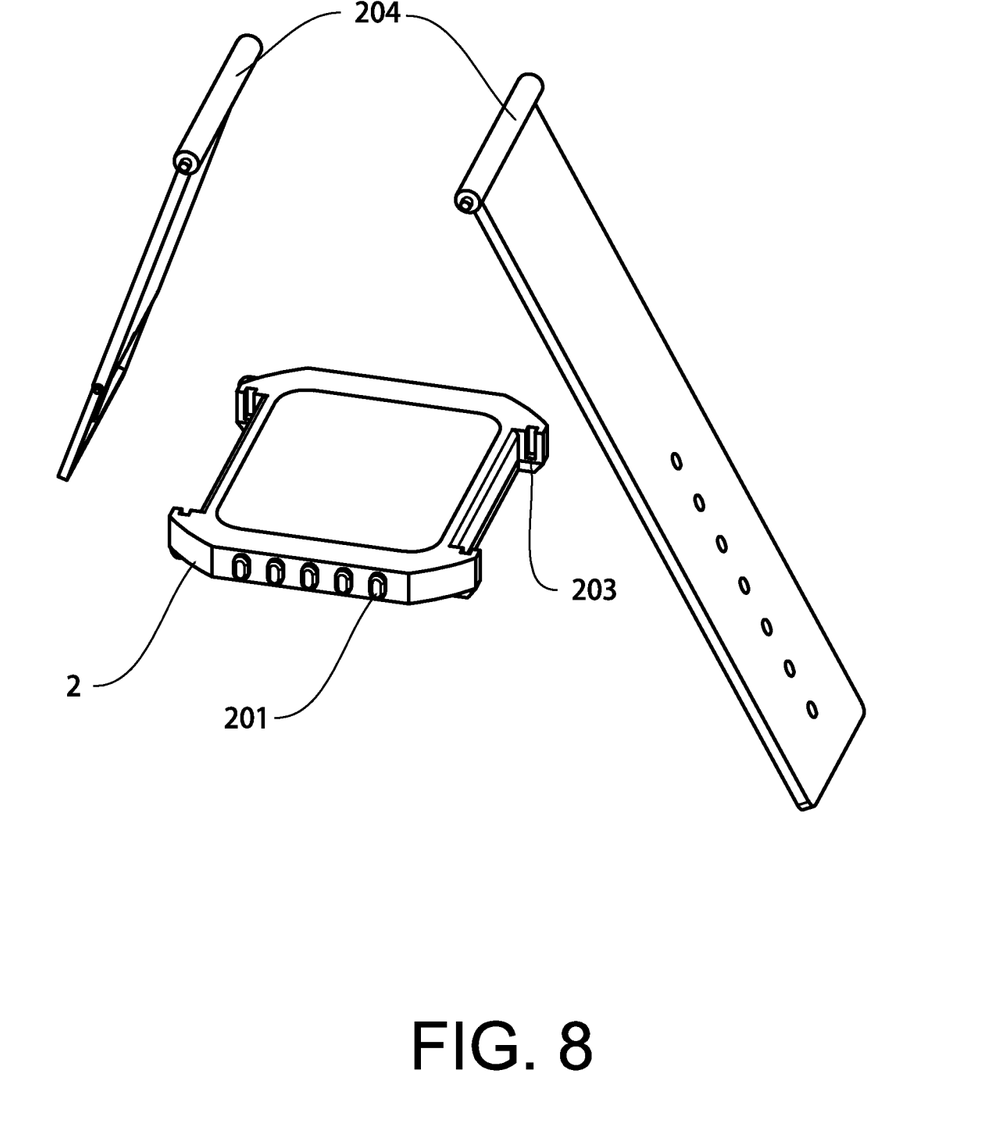
FIG. 8 shows a schematic diagram of a three-dimensional disassembly structure of a display device in the embodiment of the present disclosure.

On the basis of Embodiment 1, as shown in FIGS. 4-6, when vibration is required, a side motor button of the motor of the display device 2 or a motor remote control button on the main remote controller 1 can trigger the start of the transmission motor 302 to drive the vibration shaft 303 to rotate. The vibration is generated by repeatedly tapping the vibration shaft 303 on the contact vibrator 305 to provide a reminder.

When electric shock is needed, the discharge electrode 7 can be triggered to discharge by a discharge side button on the display device 2 or a discharge remote control button of the main remote controller 1. It is commonly used when dogs lose control; and the electric shock also provides emergency dog control function.

Embodiment 4

On the basis of Embodiment 3, if the dog experiences serious loss of control, in order to protect the safety of life and property, anesthesia dogs can be selected. Specifically, an anesthesia side button on the display device 2 or an anesthesia remote control button on the main remote controller 1 can trigger the electric cylinder 402 to start. Then, by pressing the piston plate 403 through the electric cylinder 402, the air inside the control piston 401 is input into the movable channel 404. After pressurization, the piston handle 407 is pushed down to lower the internal needle cylinder 406, which is inserted into the surface of the dog's body. Then, the piston handle 407 continues to descend to contract the internal needle cylinder 406, and the anesthetic inside the internal needle cylinder 406 is input into the dog's body for rapid anesthesia and stopping. Other movements of the dog can be supplemented later;

The electric cylinder 402, transmission motor 302, and discharge electrode 7 are all powered by an external battery 6. The external battery 6 is provided with a separate charging port, and can be charged by removing the external battery 6. A deblocking ring 409 is pulled to pull the wedge-shaped block 408 out of the wedge-shaped groove on the side of the external battery 6 to unlock it. After removing the external battery 6 for charging or replacing, it can be used.

The specific usage and function of this embodiment: in the present disclosure, when used, the selection is based on the training mode and actual scene, and indoor and outdoor use is selected.

When using it outdoors, it is generally necessary to lead the dog to the training site and then fold up the leash for training, making it inconvenient to carry a remote control. At this time, double fingers should lift the front and rear ends of the display device 2, pull it up, and directly pull it up. Then, the watch strap 204 is used to fix the display device 2 at the wrist for portable use; the display device 2 is powered by a built-in battery, and a usage status can be observed through the display screen 202. A control command can be triggered by the side buttons 201 on two sides, which are transmitted to the antenna 5 through wireless communication to further trigger the training project.

When used indoors, the display device 2 is installed back above the main remote controller 1, the bottom cover 205 is clamped between two sets of sliding installation frames 104, and it is fixed by automatically rebounding with the force provided by the outer spring of the side spring rod 103. At this time, the connection interface 102 is inserted into the bottom connection slot 206, connects the main remote controller 1 and the display device 2, and the main remote controller 1 is used to perform training control; the watch strap 204 can be selectively removed and installed conveniently. When the watch strap 204 is tied to the wrist, a direction of the force on its structure can be naturally locked to prevent the display device 2 from falling off.

During the training process, vibration reminders and discharge reminders can be selected to provide warnings.

When vibration is needed, the transmission motor 302 is started to drive the vibration shaft 303 to rotate, and the contact vibrator 305 is repeatedly tapped through the vibration shaft 303 to generate vibration as a reminder; when electric shock is needed, the discharge electrode 7 can be connected to the remote control switch for discharge, which is commonly used when dogs lose control.

If the dog is out of control, in order to protect the safety of life and property, the anesthetic can be chosen to anesthetize the dog. The electric cylinder 402 is started to press the piston piece 403, and the air inside the control piston 401 is input into the movable channel 404. After pressurization, the piston handle 407 is pushed down, the internal needle cylinder 406 is caused to descend. The internal needle cylinder 406 is inserted into the body surface of the dog, and then the piston handle 407 continues to descend to contract the internal needle cylinder 406. The anesthetic inside the internal needle cylinder 406 is injected into the dog's body for rapid anesthesia, thereby preventing other movements of the dog.

What is claimed is:

1. A detachable remote-control device for training dog indoor and outdoor, comprising:
    a main remote controller, one end of the main remote controller is provided with an opening, two sets of positioning partitions are fixedly provided in the opening; ends of two sides of the main remote controller are fixedly provided with a side spring rod, an outer side of the side spring rod is provided with a sliding installation frames; an arc-shaped clamp groove is provided in a middle of an inner wall of one of the sliding installation frames;
    a display device, which is provided with two rows of side buttons on two sides, a display screen is embedded at a top of the display device; a bottom of the display device is fixedly provided with a bottom cover, two sides of the bottom cover can be clamped between the sliding installation frames;
    a training collar, wherein a top of the training collar is fixedly provided with an overhead seat, and a top of the overhead seat is fixedly provided with an anesthesia device; a top of the anesthesia device is fixedly provided with an antenna;
    wherein the main remote controller, display device, and training collar are all provided with a wireless communication module; the main remote controller and the display device both send a control instruction to the training collar through wireless communication; the main remote controller and display device are wirelessly connected; the display device displays a control information corresponding to the control instruction when the main remote controller or the display device sends the control instruction to the training collar.

2. The detachable remote-control device for training dog indoor and outdoor according to claim 1, wherein ends at two sides of a top of the main remote controller are fixedly provided with two sets of connection interfaces; one end of the main remote controller is slidably provided with a sealing spring rod, and one end of the sealing spring rod is fixedly provided with a limit plate.

3. The detachable remote-control device for training dog indoor and outdoor according to claim 1, wherein front and rear ends of the display device are both a concave structure, a top of inner walls of two sides of the concave structure is provided with an installation slot, the installation slot is provided with a watch strap in an insertion manner; a bottom of the display device is provided with two sets of bottom connection slots, which pass through the bottom cover and align with the connection interface; the connection interface is inserted into the bottom connection slot when the bottom cover is installed between the sliding installation frames.

4. The detachable remote-control device for training dog indoor and outdoor according to claim 1, wherein a right side of a rear of the overhead seat is fixedly provided with a transmission motor; an inner of a right side of the overhead seat is rotationally provided with a vibration shaft, the vibration shaft is an eccentric shaft; a right opening of the overhead seat is fixedly provided with a sealing plate, an inner of a right side of the overhead seat is slidably provided with a contact vibrator, a spring is provided between the contact vibrator and the sealing plate; the vibration shaft can contact with the contact vibrator when the vibration shaft rotates.

5. The detachable remote-control device for training dog indoor and outdoor according to claim 1, wherein a top of the anesthesia device is integrally provided with a control piston, a top of the control piston is fixedly provided with an electric cylinder; a telescopic end of the electric cylinder is fixedly provided with a piston plate, the piston plate slides in the control piston.

6. The detachable remote-control device for training dog indoor and outdoor according to claim 5, wherein a top of the anesthesia device is fixedly provided with a movable channel, a top of the movable channel is fixedly provided with a top cover through a threaded connection, and a top of the top cover is communicated with a pipeline below an outer part of the control piston; an internal needle cylinder is provided inside the movable channel, a spring is provided outside a telescopic end of the internal needle cylinder; a piston handle above the telescopic end of the internal needle cylinder is matched and slides inside the movable channel; an extension channel is provided at a position where the overhead seat is aligned with the movable channel, and a stop ring is fixedly provided in the extension channel to limit the internal needle cylinder to move down.

7. The detachable remote-control device for training dog indoor and outdoor according to claim 1, wherein a top of the anesthesia device is slidably provided with a wedge-shaped block cooperating with a bracket, a sliding rod of the wedge-shaped block is sleeved on a spring, passes through the bracket and is fixedly provided with a deblocking ring; an external battery is insertably provided at a top of the anesthesia device, and one side of the external battery is provided with a wedge-shaped groove that matches the wedge-shaped block.

8. The detachable remote-control device for training dog indoor and outdoor according to claim 1, wherein two sets of discharge electrodes passing through the training collar are provided in the overhead seat, and the discharge electrodes are connected to the external battery.

* * * * *